United States Patent
Lorenzo et al.

(10) Patent No.: US 10,145,027 B2
(45) Date of Patent: Dec. 4, 2018

(54) FIBER COMPRISING POLYETHYLENE BLEND

(71) Applicant: Dow Global Technologies LLC, Midland, MI (US)

(72) Inventors: Arnaldo Lorenzo, Rosharon, TX (US); Selim Bensason, Baech (CH); Jacquelyn A. Degroot, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 577 days.

(21) Appl. No.: 14/771,275

(22) PCT Filed: Feb. 27, 2014

(86) PCT No.: PCT/US2014/018884
§ 371 (c)(1),
(2) Date: Aug. 28, 2015

(87) PCT Pub. No.: WO2014/163918
PCT Pub. Date: Oct. 9, 2014

(65) Prior Publication Data
US 2016/0017518 A1    Jan. 21, 2016

Related U.S. Application Data

(60) Provisional application No. 61/776,379, filed on Mar. 11, 2013.

(51) Int. Cl.
*D01F 6/46*    (2006.01)
*D01D 5/08*    (2006.01)
(Continued)

(52) U.S. Cl.
CPC ............... *D01F 6/46* (2013.01); *C08L 23/06* (2013.01); *D01D 5/08* (2013.01); *D04H 3/007* (2013.01); *D04H 3/16* (2013.01)

(58) Field of Classification Search
None
See application file for complete search history.

(56) References Cited

U.S. PATENT DOCUMENTS

| 5,082,899 A | 1/1992 | Sawyer et al. |
| 2003/0213938 A1 | 11/2003 | Farley et al. |

(Continued)

FOREIGN PATENT DOCUMENTS

| EP | 0795053 | * 12/2000 |
| JP | S59-84942 A | 5/1984 |

(Continued)

OTHER PUBLICATIONS

Malmberg, Long-Chain Branching in Metallocene-Catalyzed Polyethylene Investigated by Low Oscillatory Shear and Uniaxial Extensional Rheology, Macromolecules (2002, 35, pp. 1038-1048. (Year: 2002).*

(Continued)

*Primary Examiner* — Shawn McKinnon
(74) *Attorney, Agent, or Firm* — Husch Blackwell LLP

(57) ABSTRACT

The present disclosure is directed to a fiber that is composed of a polymeric blend including (i) 95 wt % to 99 wt % of a high density ethylene-based polymer having a Mw/Mn from 2.0 to 3.0 and (ii) from 5 wt % to 1 wt % of a low density ethylene-based polymer having a melt index from 5 g/10 min to 15 g/10 min. The fiber has a density from 1 denier to 2 denier and a 3% secant modulus from 8.5 g/denier to 20 g/denier.

18 Claims, 7 Drawing Sheets

(51) Int. Cl.
*D04H 3/16* (2006.01)
*C08L 23/06* (2006.01)
*D04H 3/007* (2012.01)

(56) References Cited

U.S. PATENT DOCUMENTS

2007/0203301 A1    8/2007  Autran et al.
2007/0260016 A1*  11/2007  Best .................. B32B 27/32
                                                                    525/240

FOREIGN PATENT DOCUMENTS

JP      H10-158969 A      6/1998
WO     2004/003278 A1    1/2004
WO     2008/123593 A1   10/2008

OTHER PUBLICATIONS

Vittorias et al., Detection and Qualification of Industrial Polyethylene branching Topologies via Fourier-Transform Rheology, NMR and Simulation using Pom-Pom model, Rheol Acta (2007, 46, pp. 321-340. (Year: 2007).*
Hang Sang Lee et al., Polymer Engineering and Science, May 2000, vol. 40, No., pp. 1132-1142.
Anton Santamaria et al., Journal of Applied Polymer Science, vol. 31, pp. 209-224 (1986).
Williams et al., J. Polym Sci., Polym. Letters, vol. 6, pp. 621-624 (1968).

* cited by examiner

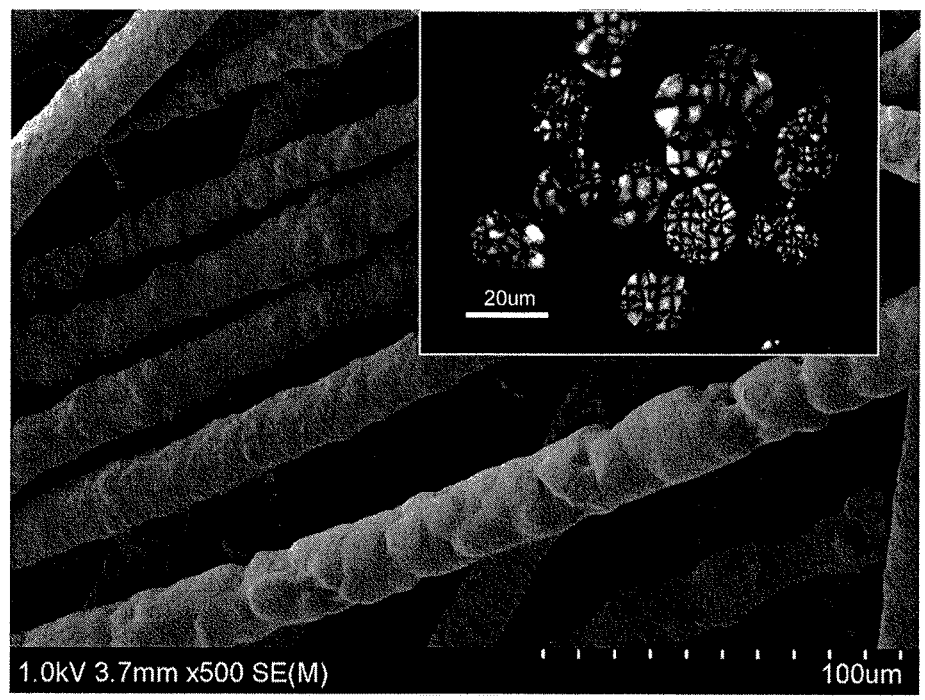
Figure 5 – SEM of HDPE1 fabric showing surface roughness. Inset: Optical microscopy picture of the fabric cross-section area showing spherulitic morphology.

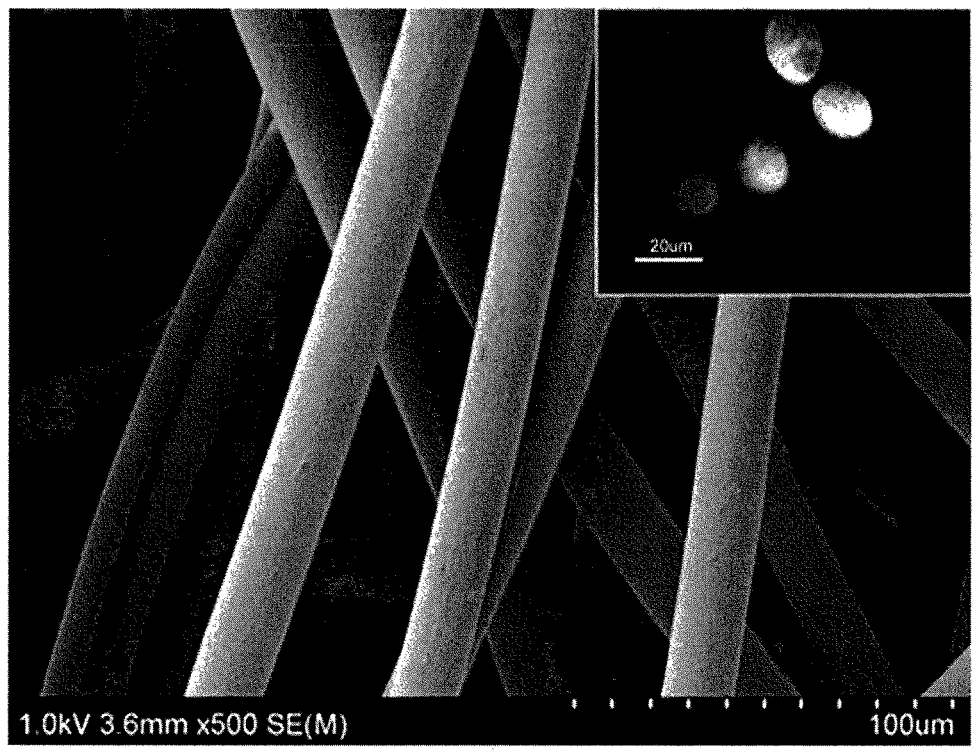
Figure 6 – SEM of HDPE2 fabric with optical microscopy picture given in inset.

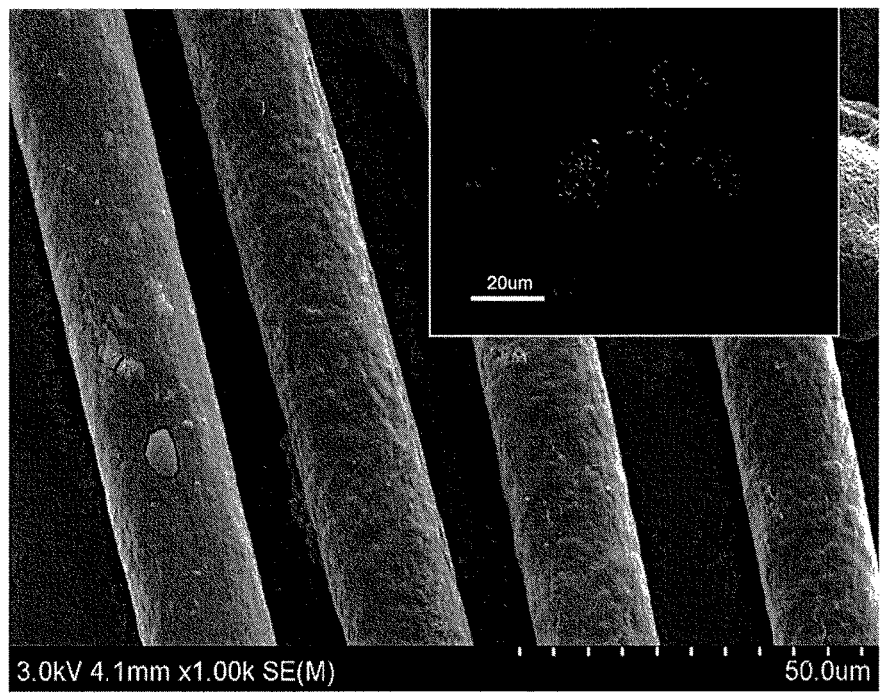
Figure 7 – SEM of HDPE1 fibers showing surface roughness. Inset: Optical microscopy picture of the fibers cross-section area showing spherulitic morphology.

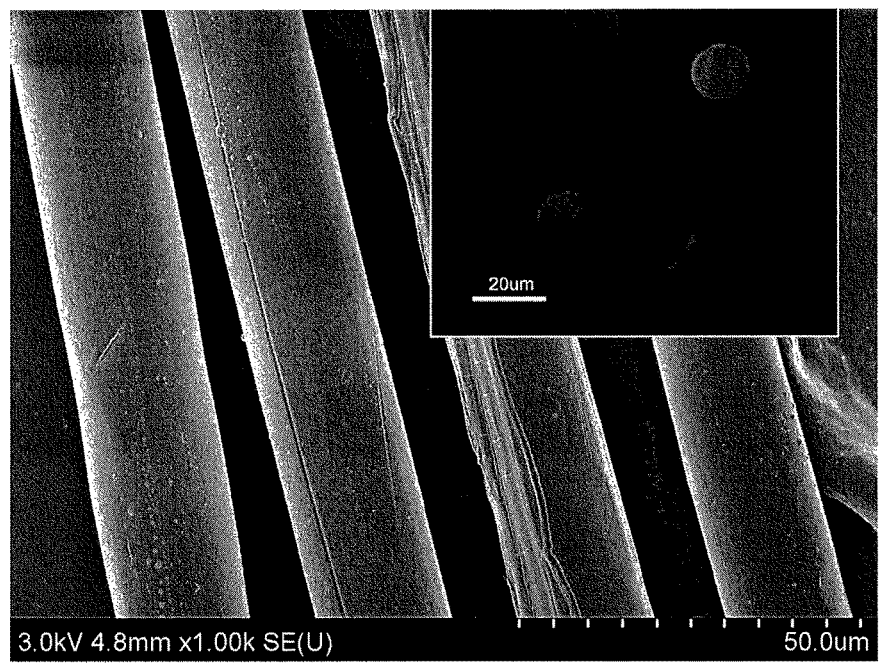
Figure 8 – SEM of the blend with HDPE1 with 3% LDPE2. Inset: Optical microscopy picture of the fibers cross-section area does not show any spherulitic morphology.

FIBER COMPRISING POLYETHYLENE BLEND

BACKGROUND

This disclosure relates to fibers of ethylene-based polymers, suitable for spunbond nonwoven fabrics. Spunbond nonwoven fabrics are widely used in various applications, such as hygiene, medical, industrial, or automotive applications to provide low basis weight, economical, strong, and cloth-like fabrics. In the case of hygiene articles such as diapers, there is a need for soft nonwoven fabrics. Fibers based on ethylene polymers used in nonwoven fabrics impart enhanced softness to the fabrics when compared to conventional nonwoven fabrics based on polypropylene. However, fibers of ethylene-based polymers and nonwoven fabrics made thereof have lower modulus and tensile strength, when compared with equivalent fibers and fabrics made from polypropylene. The lack of comparable modulus and tensile strength is a challenge in substitution of polypropylene with ethylene-based polymers offering enhanced softness, due to requirements associated with down-stream processing of nonwoven fabrics into hygiene articles like baby diapers, as well as end-use performance requirements.

A need therefore exists for ethylene-based polymer fibers with increased modulus and tensile strength that can be made into soft nonwoven fabrics having increased modulus and tensile strength.

SUMMARY

The present disclosure provides a fiber that is composed of a polymeric blend of (i) a high density ethylene-based polymer and a minor amount of (ii) a low density ethylene-based polymer. The fiber exhibits enhanced modulus compared to fiber composed of the neat (i) high density ethylene-based polymer.

In an embodiment, the fiber includes a polymeric blend including (i) from 95 wt % to 99 wt % of a high density ethylene-based polymer having a $M_w/M_n$ from 2.0 to 3.0 and (ii) from 5 wt % to 1 wt % of a low density ethylene-based polymer having a melt index from 5 g/10 min to 15 g/10 min. The fiber has a density from 1 denier to 2 denier and a 3% secant modulus from 8.5 g/denier to 20 g/denier.

In an embodiment, the fiber has a ramp-to-break from 2600 meters per minute (mpm) to 3200 mpm.

The present disclosure provides a fabric. In an embodiment, the fabric includes the fiber.

BRIEF DESCRIPTION OF THE DRAWINGS

FIG. 5 is a scanning electron microscopy (SEM) micrograph of a spunbond nonwoven fabric made with 100% of the high density ethylene-based polymer HDPE 1—illustrating high surface roughness of fibers. The micrograph in the inset is obtained by optical microscopy of the fabric sectioned through the thickness direction, and indicates presence of large spherulites in the fiber, giving rise to high surface roughness.

FIG. 6 is a SEM micrograph of a spunbond nonwoven fabric made with 100% of the high density ethylene-based polymer HDPE 2—illustrating smooth fibers. The micrograph in the inset is obtained by optical microscopy of the fabric sectioned in the thickness direction, has no indication of spherulites in the fiber, giving rise to high surface roughness.

FIG. 7 is a SEM micrograph of mono-spun fibers made with 100% HDPE1—illustrating surface roughness similar to that in FIG. 5. The micrograph in the inset is obtained by optical microscopy of the fabric sectioned in the thickness direction, and indicates presence of a fine spherulitic morphology.

FIG. 8 is a SEM micrograph taken by scanning electron microscopy of mono-spun fibers of 97% of HDPE1 and 3% LDPE2—illustrating the smooth surface of fibers, achieved by blending.

DETAILED DESCRIPTION

Figure 1:
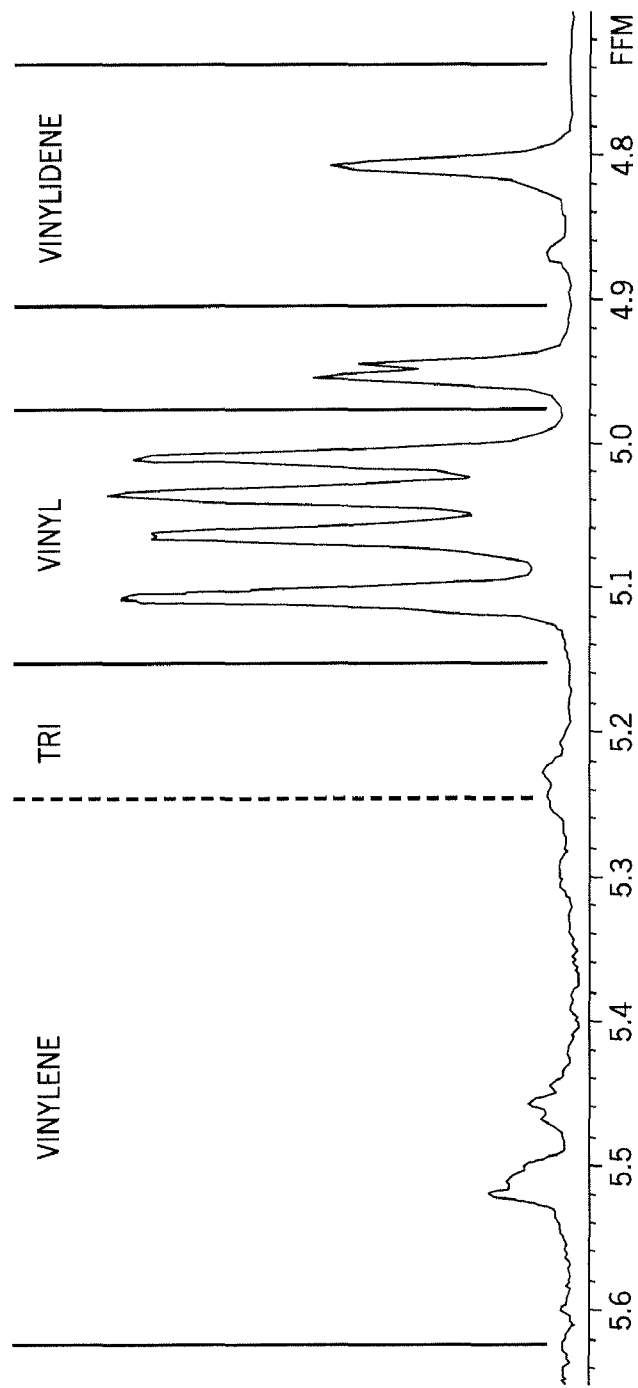
FIG. 1 is an NMR spectrograph showing the regions analyzed for the determination of unsaturations.

The present disclosure provides a fiber. The fiber is composed of polymeric blend comprising:

(A) from 95 wt % to 99 wt % of a high density ethylene-based polymer having a $M_w/M_n$ from 2.0 to 3.0; and (B) from 5 wt % to 1 wt % of a low density ethylene-based polymer having a melt index from 5 g/10 min to 15 g/10 min.

The fiber has a density from 1 denier to 2 denier and a 3% secant modulus from 8.5 g/denier to 20 g/denier.

In an embodiment, the fiber has a density from 1 denier to 2 denier and a 3% secant modulus from 10 g/denier to 20 g/denier.

A "fiber," as used herein, is an elongated strand of material in which the length to density ratio is greater than 10. A fiber typically has a round, or substantially round, cross section. Other cross-sectional shapes for the fiber include a trilobal shape, or a flat (i.e., "ribbon" like) shape. A fiber excludes a film which has opposing parallel, or substantially parallel, sides.

1. High Density Ethylene-Based Polymer

The fiber includes a high density ethylene-based polymer. The term "ethylene-based polymer" is a polymer that contains more than 50 mole percent polymerized ethylene monomer (based on the total amount of polymerizable monomers) and, optionally, may contain at least one comonomer. A "high density ethylene-based polymer" (or "HDPE") is an ethylene-based polymer with a density greater than 0.930 g/cc, or a density from greater than 0.930 g/cc to 0.97 g/cc. The HDPE can be an ethylene homopolymer or an ethylene copolymer composed of ethylene monomer co-polymerized with one or more $C_3$-$C_{10}$ α-olefins.

The HDPE includes (a) less than or equal to 100 percent, for example, at least 70 percent, or at least 80 percent, or at least 90 percent, by weight of the units derived from ethylene; and (b) less than 30 percent, for example, less than 25 percent, or less than 20 percent, or less than 10 percent, by weight of units derived from one or more α-olefin comonomers.

The α-olefin comonomers typically have no more than 20 carbon atoms. For example, the α-olefin comonomers may have 3 to 10 carbon atoms, or 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In an embodiment, the one or more α-olefin comonomers may, for example, be selected from propylene, 1-butene, 1-hexene, and 1-octene, and combinations thereof. In a further embodiment, the one or more α-olefin comonomers are selected from 1-hexene, 1-octene, and combinations thereof.

The HDPE has a weight average molecular weight ($M_w$) in the range from 15,000 to 150,000 daltons. For example, the molecular weight ($M_w$) can be from a lower limit of 15,000, 20,000, or 30,000 daltons to an upper limit of 100,000, 120,000, or 150,000 daltons.

The HDPE has a molecular weight distribution ($M_w/M_n$) in the range from 2.0 to 3.0. For example, the $M_w/M_n$ can be from a lower limit of 2.0, 2.1, or 2.2 to an upper limit of 2.5, 2.7, 2.9, or 3.0.

In an embodiment, the HDPE has a $M_w/M_n$ from 2.0, or 2.2 to 2.4, or 2.5.

The HDPE has a melt index (MI or $I_2$) in the range of 15 g/10 minutes (min) to 30 g/10 minutes. For example, the melt index ($I_2$) can be from a lower limit of 15, 16, 17, 18, or 20 g/10 minutes to an upper limit of 18, 20, 24, 26, 28, or 30 g/10 minutes.

In an embodiment, the HDPE includes less than or equal to 100 parts, for example, from 0 parts, or greater than 0 parts to less than 10 parts, or less than 8 parts, or less than 5 parts, or less than 4 parts, or less than 1 part, or less than 0.5 parts, or less than 0.1 parts, by weight of hafnium residue remaining from a hafnium based metallocene catalyst per one million parts of HDPE. The hafnium residues remaining from the hafnium based metallocene catalyst in the HDPE may be measured by x-ray fluorescence (XRF), which is calibrated to reference standards. The HDPE polymer resin granules can be compression molded at elevated temperature into plaques having a thickness of about ⅜ of an inch for the x-ray measurement. At very low concentrations of metal, such as below 0.1 ppm, inductively coupled plasma atomic emission spectroscopy (ICP-AES) would be a suitable method to determine metal residues present in the present HDPE.

In another embodiment, the HDPE includes from 0 parts, or greater than 0 parts to less than or equal to 100 parts, or less than 10 parts, or less than 8 parts, or less than 5 parts, or less than 4 parts, or less than 1 part, or less than 0.5 parts, or less than 0.1 parts, by weight of metal complex residues remaining from a catalyst system comprising a metal complex of a polyvalent aryloxyether per one million parts of the HDPE. The metal complex residues remaining from the catalyst system comprising a metal complex of a polyvalent aryloxyether in the HDPE may be measured by x-ray fluorescence (XRF), which is calibrated to reference standards. The HDPE polymer resin granules can be compression molded at elevated temperature into plaques having a thickness of about ⅜ of an inch for the x-ray measurement in a preferred method. At very low concentrations of metal complex, such as below 0.1 ppm, ICP-AES would be a suitable method to determine metal complex residues present in the present HDPE.

In an embodiment, the HDPE is produced by way of a polyvalent aryloxyether (hereafter polyvalent aryloxyether-catalyzed HDPE) that is [2,2'''-[1,3-propanediylbis(oxy-κO)]bis[3'',5,5''-tris(1,1-dimethylethyl)-5'-methyl[1,1':3',1''-terphenyl]-2'-olato-κO]]dimethyl-, (OC-6-33)-Zirconium, represented by the structure (I) below.

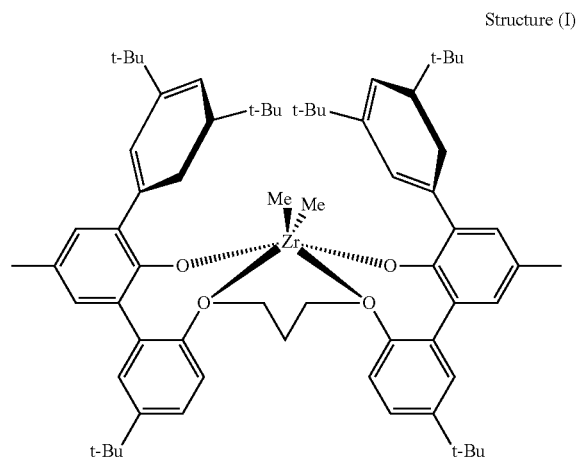

Structure (I)

In an embodiment, the polyvalent aryloxyether-catalyzed HDPE is an ethylene/octene copolymer with one, some, or all of the following properties:
 a density from greater than 0.93 g/cc to 0.96 g/cc;
 a $M_w/M_n$ from 2.0 to 2.5;
 an $I_2$ from 15 g/10 min to 20 g/10 min;
 an Mz/Mw less than 2.0, or from 1.0, or 1.3 to 1.5, or 1.6 to less than 2.0;
 a ZSVR greater than 1.1, or from 1.2 to 1.5; and
 a vinyls/$10^6$ carbons (C) less than 100, or from 10, or 25, or 50 to 75 to less than 100 vinyls $10^6$ carbons (C).

The HDPE may comprise two or more embodiments disclosed herein.

2. Low Density Polyethylene

The blend of the present fiber includes a low density ethylene-based polymer. A "low density ethylene-based polymer" (or "LDPE") is an ethylene homopolymer having a density from 0.915 g/cc to 0.930 g/cc and is produced by way high pressure free radical polymerization, in a tubular, or autoclave process or hybrids thereof The LDPE excludes linear low density polyethylene and excludes high density polyethylene (i.e., ethylene-based polymer with density greater than 0.93 g/cc).

The LDPE has an $M_w/M_n$ greater than 5.0, or greater than 6.0. In an embodiment, the LDPE has an $M_w/M_n$ with a lower limit from 6.0, or 7.0, or 8.0 to an upper limit from 10.0, or 11.0, or 12.0, or 13.0, or 14.0, or 15.0.

The LDPE has an $I_2$ from 1 g/10 min to 30 g/10 min. In an embodiment, the LDPE has an $I_2$ from 5 g/10 min to 15 g/10 min.

In an embodiment, the LDPE has a density from 0.915 g/cc to 0.925 g/cc and a melt index from 5 g/10 min to 15 g/10 min.

In an embodiment, the LDPE is produced in a high-pressure tubular reactor ("HP-LDPE"). The HP-LDPE has a density from 0.915 g/cc, or 0.920 g/cc to 0.93 g/cc. The HP-LDPE has an $I_2$ from 5 g/10 min, or 6 g/10 min, or 7 g/10 min, to 8 g/10 min, or 9 g/10 min, or 10 g/10 min.

In an embodiment, the LDPE is a HP-LDPE (tubular) with one, some, or all of the following properties:
 a density from 0.915 g/cc to 0.930 g/cc;
 a $M_w/M_n$ from 5.0 to 7.0; and
 an $I_2$ from 10 g/10 min to 20 g/10 min.

In an embodiment, the LDPE is produced in an autoclave and has one, some, or all of the following properties:

a density from 0.915 g/cc to 0.920 g/cc;
a $M_w/M_n$ from 11.0 to 12.0; and
an $I_2$ from 7 g/10 min to 9 g/10 min.

Each of the HDPE and the LDPE may further include additional optional components such as one or more additives. Such additives include, but are not limited to, antistatic agents, color enhancers, dyes, lubricants, fillers, pigments, primary antioxidants, secondary antioxidants, processing aids, UV stabilizers, anti-blocks, slip agents, tackifiers, fire retardants, anti-microbial agents, odor reducer agents, anti-fungal agents, and combinations thereof. Each of the HDPE and the LDPE may contain from about 0.1 to about 10 percent by the combined weight of such additives, based on the weight of the individual resin including such additives.

The present LDPE may comprise two or more embodiments disclosed herein.

3. Fiber

The present fiber may be a monofilament fiber, a homofil fiber, or a bicomponent fiber.

In an embodiment, the fiber is a monofilament fiber. A "monofilament fiber" or "monofiber" is a continuous strand of material of indefinite (i.e., not predetermined) length, as opposed to a "staple fiber" which is a discontinuous strand of material of definite length (i.e., a strand which has been cut or otherwise divided into segments of a predetermined length).

In an embodiment, the fiber is a homofil fiber. A "homofil fiber" is a fiber that has a single polymer region or domain, and that does not have any other distinct polymer regions (as do bicomponent fibers).

In an embodiment, the fiber is a bicomponent fiber. A "bicomponent fiber" is a fiber that has two or more distinct polymer regions or domains. Bicomponent fibers are also known as conjugated or multicomponent fibers. The polymers are usually different from each other although two or more components may comprise the same polymer. The polymers are arranged in substantially distinct zones across the cross-section of the bicomponent fiber, and usually extend continuously along the length of the bicomponent fiber. The configuration of a bicomponent fiber can be, for example, a sheath/core arrangement (in which one polymer is surrounded by another), a side by side arrangement, a pie arrangement or an "islands-in-the sea" arrangement.

The fiber may be a melt-spun fiber or a meltblown fiber.

In an embodiment, the fiber is a melt-spun fiber. A "melt-spun fiber," as used herein, is a fiber produced by a melt-spinning process. Melt-spinning is a process whereby a polymer melt is extruded through a plurality of fine die capillaries (such as a spinnerette, for example) as molten filaments while simultaneously applying an extensional force which reduces the density of the molten filaments. The molten filaments solidify upon cooling below their melt temperature to form fibers. The term "melt spinning" encompasses stable fiber spinning (including short spinning and long spinning) and bulk continuous filament fiber. Melt spun fibers may be cold-drawn.

In an embodiment, the fiber is a meltblown fiber. A "meltblown fiber" is a fiber formed by extruding a molten thermoplastic polymer composition through a plurality of fine, usually circular, die capillaries as molten threads or filaments into converging high velocity gas streams (e.g. air) which function to attenuate the threads or filaments to reduced density. The filaments or threads are carried by the high velocity gas streams and deposited on a collecting surface to form a web of randomly dispersed fibers with average density generally smaller than 10 microns.

In an embodiment, the fiber has a density with a lower limit of 1 denier, or 2 denier, or 3 denier, or 4 denier and an upper limit of 5 denier, or 6 denier, or 7 denier, or 8 denier, or 9 denier, or 10 denier.

In an embodiment, the fiber has a density from of 2 denier and a ramp-to-break from 2600 meters per minute (mpm) to 3200 mpm.

In an embodiment, the fiber has a density of 2 denier and has a tensile strength from 1.0 g/denier to 1.3 g/denier.

The fiber may optionally include one or more other additives. Nonlimiting examples of suitable additives include stabilizers, antioxidants, fillers, colorants, nucleating agents, mold release agents, dispersing agents, catalyst deactivator, UV light absorbent, flame retardant, coloring agent, mold release agent, lubricant, anti-static agent, pigment any combination of the foregoing.

The present fiber may comprise two or more embodiments disclosed herein.

4. Fabrics

The present fiber can be used to make fabric spunbond nonwoven fabrics, bonded carded webs, woven fabrics, knitted fabrics, woven tapes, and artificial turf.

In an embodiment, the present fiber is used to make a non-woven fabric. As used herein a "non-woven" or a "non-woven fabric" or "non-woven material" is an assembly of fibers (for example, core/sheath, islands in the sea, side by side, segmented pie etc.) held together in a random web such as by mechanical interlocking or by fusing at least a portion of the fibers. The non-woven fabrics according to the present disclosure may be fabricated via different techniques. Such methods include, but are not limited to, spunbond process, carded web process, air laid process, thermo-calendaring process, adhesive bonding process, hot air bonding process, needle punch process, hydroentangling process, electrospinning process, and combinations thereof.

In an embodiment, the present fiber is produced by way of a spunbond process. In a spunbond process, the fabrication of non-woven fabric includes the following steps: (a) extruding strands of the HDPE/LDPE blend from a spinneret; (b) quenching the strands of the blend with a flow of air which is generally cooled in order to hasten the solidification of the molten strands of the blend; (c) attenuating the filaments by advancing them through the quench zone with a draw tension that can be applied by either pneumatically entraining the filaments in an air stream or by winding them around mechanical draw rolls of the type commonly used in the textile fibers industry; (d) collecting the drawn strands into a web on a foraminous surface, e.g. moving screen or porous belt; and (e) bonding the web of loose strands into the non-woven fabric. Bonding can be achieved by a variety of means including, but not limited to, thermo-calendaring process, adhesive bonding process, hot air bonding process, needle punch process, hydroentangling process, and combinations thereof.

The spunbond non-woven fabric can be formed into multilayer or laminate structures. Such multilayer structures comprise at least two or more layers, wherein at least one or more layers are spunbond non-woven fabrics according to the present disclosure, and one or more other layers are selected from one or more melt blown non-woven layers, one or more wet-laid non-woven layers, one or more air-laid non-woven layers, one or more webs produced by any non-woven or melt spinning process, one or more film layers, such as cast film, blown film, one or more coating layers derived from a coating composition via, for example, extrusion coating, spray coating, gravure coating, printing, dipping, kiss rolling, or blade coating. The laminate structures can be joined via any number of bonding methods; thermal bonding, adhesive lamination, hydroentangling, needle punching. Structures can range from S to SX, or SXX, or, SXXX, or SXXXX, or SXXXXX, whereby the X can be a film, coating, or other non-woven material in any combination. Additional spunbond layers can be made from the ethylene-based polymer composition, as described herein, and optionally in combinations with one or more polymers and/or additives.

In the case of the staple or binder fibers, the fibers can be mixed with a variety of other fibers including synthetic fibers such as polyethylene (PE), polypropylene (PP), polyethylene terephthalate (PET), or natural fibers such as cellulose, rayon, or cotton. These fibers can be wet laid, air laid or carded into a non-woven web. The non-woven web can then be laminated to other materials.

The spunbond non-woven fabric can be used in various end-use applications including, but not limited to, hygiene absorbent products such diapers, feminine hygiene articles, adult incontinence products, wipes, bandages and wound dressings, and disposable slippers and footwear, medical application such isolation gowns, surgical gowns, surgical drapes and covers, surgical scrub suits, caps, masks, and medical packaging.

In an embodiment, the present fiber can be used with a carding line to produce fabric.

In an embodiment, the present fiber can be used to make carpeting, woven textiles, artificial turf, or other fiber-containing articles.

Definitions

The terms "comprising", "including", "having" and their derivatives do not exclude the presence of any additional component or procedure. The term, "consisting essentially of" excludes any other component or procedure, except those essential to operability. The term "consisting of" excludes any component or procedure not specifically stated.

The term "denier" is the linear mass density of a fiber. Denier is defined as the grams of the fiber per 9000 meters of the fiber length.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term "ramp-to-break" is the drawing speed, in meters per minute (or mpm), at which the melt-spun fiber completely breaks and is discontinuous.

Test Methods
  Density
  Samples that are measured for density are prepared according to ASTM D-1928. Measurements are made within one hour of sample pressing using ASTM D-792, Method B.
  Melt Index
  Melt index (MI), or $I_2$, is measured in accordance with ASTM-D 1238, Condition 190° C./2.16 kg, and is reported in grams eluted per 10 minutes. $I_N$, is measured in accordance with ASTM-D 1238, Condition 190° C./10 kg, and is reported in grams eluted per 10 minutes.

High Temperature Gel Permeation Chromatography (GPC)

The Gel Permeation Chromatography (GPC) system consists of a Waters (Milford, Mass.) 150° C. high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using the following Equation (as described in Williams and Ward, *J Polym. Sci.*, Polym. Letters, 6, 621 (1968)):

$$M_{polyethylene} = A \times (M_{polystyrene})^B,$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

The moments of the molecular weight distribution, $M_n$ (number-average molecular weight), $M_w$ (weight-average molecular weight) and $M_z$ (z-average molecular weight) are computed from the data as follows, where $W_i$ is weight fraction of species with molecular weight $M_i$:

$$M_n = \frac{\sum_i W_i}{\sum_i (W_i/M_i)}$$

$$M_w = \frac{\sum_i W_i \cdot M_i}{\sum_i W_i}$$

$$M_z = \frac{\sum_i W_i \cdot M_i^2}{\sum_i W_i \cdot M_i}$$

Differential Scanning Calorimetry

Measurements are performed with a TA instruments Q1000 DSC, equipped with an RCS (refrigerated cooling system) and an autosampler. Each sample is first melt pressed into a thin film at 175° C.; the melted sample is then air-cooled to room temperature. A 3=10 mg, 6 mm diameter specimen is extracted from the cooled polymer, weighed, placed in a light aluminum pan (ca 50 mg), and crimped shut. The thermal behavior of the sample is determined by ramping the sample temperature up and down to create a heat flow versus temperature profile. During testing, a nitrogen purge gas flow of 50 ml/min is used. First, the sample is rapidly heated to 180° C. and held isothermal for 3 min in order to remove its thermal history. Next, the sample is cooled to −40° C. at 10° C./min cooling rate and held isothermal at −40° C. for 3 min. The sample is then heated to 150° C. (2nd heating scan) at a 10° C./min heating rate. The cooling and heating (2nd scan) curves are recorded. The cooling curve is analyzed by setting baseline endpoints from the beginning of the crystallization to −20° C. The heating curve is analyzed by setting baseline endpoints from −20° C. to the end of the melt. The values determined are peak melting temperature (Tm), peak crystallization temperature (Tc), heat of fusion (Hf) (in J/g) and heat of crystallization (Hc) (in J/g).

Creep Zero Shear Viscosity Measurement Method

Zero-shear viscosities are obtained via creep tests that are conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then loared down to 50 µm above the desired testing gap (1.5 mm). Any superfluous material is trimmed off and the upper plate is loared to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ s$^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equation:

$$ZSVR = \frac{\eta_{0B}}{\eta_{0L}} = \frac{\eta_{0B}}{2.29 \times 10^{-15} M_{w-gpc}^{3.65}}$$

The ZSV value is obtained from creep test at 190° C. via the method described above. The Mw-gpc value is determined by the conventional GPC method. The correlation between ZSV of linear polyethylene and its Mw-gpc is established based on a series of linear polyethylene reference materials. A description for the ZSV-Mw relationship can be found in the ANTEC proceeding: Kaijala, Teresa P.; Sammler, Robert L.; Mangnus, Marc A.; Hazlitt, Lonnie G.; Johnson, Mark S.; Hagen, Charles M., Jr.; Huang, Joe W. L.; Reichek, Kenneth N. Detection of low levels of long-chain branching in polyolefins. Annual Technical Conference—Society of Plastics Engineers (2008), 66th 887-891.

$^1$H NMR Method 3.26 g of stock solution is added to 0.133 g of polyolefin sample in 10 mm NMR tube. The stock solution is a mixture of tetrachloroethane-d$_2$ (TCE) and perchloroethylene (50: 50, w:w) with 0.001M Cr$^{3+}$. The solution in the tube is purged with N$_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer.

Two experiments are run to get the unsaturation: the control and the double presaturation experiments. For the control experiment, the data is processed with exponential window function with LB=1 Hz, baseline is corrected from 7 to −2 ppm. The signal from residual $^1$H of TCE is set to 100, the integral $I_{total}$ from −0.5 to 3 ppm is used as the signal from whole polymer in the control experiment. The number of CH$_2$ group, NCH$_2$, in the polymer is calculated as following:

$NCH_2 = I_{total}/2$

For the double presaturation experiment, the data is processed with exponential window function with LB=1 Hz, baseline is corrected from 6.6 to 4.5 ppm. The signal from residual $^1$H of TCE is set to 100, the corresponding integrals for unsaturations ($I_{vinylene}$, $I_{trisubstituted}$, $I_{vinyl}$ and $I_{vinylidene}$) are integrated based on the region shown in FIG. 1.

The number of unsaturation unit for vinylene, trisubstituted, vinyl and vinylidene are calculated:

$$N_{vinylene} = I_{vinylene}/2$$

$$N_{trisubstituted} = I_{trisubstitute}$$

$$N_{vinyl} = I_{vinyl}/2$$

$$N_{vinylidene} = I_{vinylidene}/2$$

The unsaturation unit/1,000,000 carbons is calculated as following:

$$N_{vinylene}/1,000,000C = (N_{vinylene}/NCH_2)*1,000,000$$

$$N_{trisubstituted}/1,000,000C = (N_{trisubstituted}/NCH_2)*1,000,000$$

$$N_{vinyl}/1,000,000C = (N_{vinyl}/NCH_2)*1,000,000$$

$$N_{vinylidene}/1,000,000C = (N_{vinylidene}/NCH_2)*1,000,000$$

The requirement for unsaturation NMR analysis includes: level of quantitation is 0.47±0.02/1,000,000 carbons for Vd2 with 200 scans (less than 1 hour data acquisition including time to run the control experiment) with 3.9 wt % of sample (for Vd2 structure, see Macromolecules, vol. 38, 6988, 2005), 10 mm high temperature cryoprobe. The level of quantitation is defined as signal to noise ratio of 10.

The chemical shift reference is set at 6.0 ppm for the $^1H$ signal from residual proton from TCT-d2. The control is run with ZG pulse, TD 32768, NS 4, DS 12, SWH 10,000 Hz, AQ 1.64 s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64 s, D1 1 s, D13 13 s. The modified pulse sequences for unsaturation with Bruker AVANCE 400 MHz spectrometer are shown below:

```
;lc1prf2_zz
prosol relations=<lcnmr>
#include <Avance.incl>
"d12=20u"
"d11=4u"
1 ze
d12 pl21:f2
2 30m
d13
d12 pl9:f1
d1 cw:f1 ph29 cw:f2 ph29
d11 do:f1 do:f2
d12 pl1:f1
p1 ph1
go=2 ph31
30m mc #0 to 2 F0(zd)
exit
ph1=0 2 2 0 1 3 3 1
ph29=0
ph31=0 2 2 0 1 3 3 1
```

Preparation of Blends by Twin Screw Extruder Compounding

Blends are prepared with a 30 mm co-rotating, intermeshing Coperion Werner-Pfleiderer ZSK-30 (ZSK-30) twin screw extruder. The ZSK-30 has ten barrel sections with an overall length of 960 mm and a 32 length to diameter ratio (L/D). The temperature in the feed zone is 80° C. Zones 1 to 4 are set at 160, 180, 185 and 190° C., respectively. The die temperature is 230° C. The screw speed is set at 325 rpm resulting in an output rate of approximately 18.14 kg/hr (40 lb/hr).

Fiber Spinning Procedure

Fibers are spun on a Hills bicomponent continuous filament fiber spinning line at a throughput rate of 0.50 grams per hole per minute. A Hills bicomponent die is used operating at a 50/50 core/sheath ratio with same material fed into each extruder, thereby forming monocomponent fibers. The die configuration consists of 144 holes, with a hole diameter of 0.6 mm and an L/D of 4/1. Quench air temperature and flow rate are set at 15° C., and 30% of maximum, respectively. Extruder profiles are adjusted to achieve a melt temperature of 220-224° C. Fiber bundle is wrapped around the godets a minimum of 4 times, with no draw between the 2 godets, and then evacuated to an aspirator so as to eliminate any variability due to winder.

Draw Down Capability: Ramp-to-break measurements

Ramp-to-break is a method for determining the maximum line speed for drawing down fibers on the Hills line as achieved by gradually increasing the take up speed of the filament bundle. This is accomplished with a ramping method to a point where at least one fiber break occurs. The highest speed that a material can be run for a minimum of 30 seconds without a single fiber break is the maximum draw down speed or ramp-to-break speed. The ramping procedure starts at 1500 mpm winding speed—or lower, if necessary. The material is run at this line speed for 30 seconds and if no fiber breaks are observed then the godet roll speed is increased by 250 mpm over 30 seconds. The material is run for 30 seconds at each interim point while checking for breaks. This is done until a break is achieved. The speed at which the break occurs is recorded. The process is repeated a minimum of three times and the average is recorded as the maximum draw down speed via the ramp-to-break methodology. The standard deviation for repeat measurements on the same polymer is ca 100 mpm.

Fiber Tensile Testing

Tensile stress strain curves of fibers are tested according to ASTM Standard D 2256. A strand of 144 fibers is tested as a single bundle using an MTS Sintech 5/G testing machine. Conventional fiber horn grips are used. Jaws are set an initial separation of 8 inches (i.e., 8 inch initial gauge length). The crosshead speed is set to 16 inches/minute. Five replicates are run for each sample. The average and standard deviation in secant modulus at 3% strain, the peak tensile strength, and the elongation at peak tensile strength are reported in tabular form.

Birefrigence Measurements

The birefringence in fibers is measured for four individual filaments using an optical microscope. Filaments of ca 1 cm length are mounted on a clean glass slide, taking care not to apply any stretching. A small drop of Norland Optical Adhesive is placed on the fibers and a clean cover slip is positioned over them. The adhesive is cured under a UV lamp for 5 minutes. A photomicrograph is taken of each filament with a 40× objective and the diameter of each filament is measured using an image analysis software. Five thickness measurements are taken of each fiber and are averaged. To measure the retardation of the fiber, a Nikon Eclipse E600 polarizing microscope with a Nichika Berek compensator accessory is used. Birefringence is calculated by dividing the retardation by the thickness.

Scanning Electron Microscopy

A Hitachi SU-70 scanning electron microscope operated with an accelerating voltage of 1 kV, 4 mm working distance, in field free lens mode is used to capture images of the fibers in nonwoven fabrics. Pieces of the nonwoven fabrics are cut and mounted on aluminum SEM stubs using carbon tape and carbon paint. The samples are sputter coated using Ir prior to imaging.

Optical Microscopy

An Olympus Vanox-S compound light microscope equipped with a Nikon DCM-1000 digital camera and ACT-1 image acquisition software is used to collect transmitted cross-polarized light micrographs of the fiber cross-sections. The nonwoven is cut into thin strips, embedded in EpoFix™ and allowed to set 18 hours. Sections are taken of the embedded fibers ca. 2.5 um thick at −80° C. using a Leica UCT6 microtome and diamond knife. Sections are placed onto a glass slide with immersion oil and cover slip applied.

Some embodiments of the present disclosure will now be disclosed in detail in the following Examples.

EXAMPLES

1. Materials

Materials for the examples and comparative samples are listed in Table 1 below.

TABLE 1

|  | Designation | Density (g/cc) | $I_2$ (dg/min) | Mw/Mn |
|---|---|---|---|---|
| HDPE | HDPE1 Ethylene/octene copolymer | 0.950 | 18 | 2.05 |
| Aspun 6835A | HDPE2 | 0.950 | 17 | 3.55 |
| LDPE 621I | LDPE1 | 0.918 | 2.3 | 9.4 |
| LDPE 722 (autoclave) | LDPE2 | 0.918 | 8.0 | 11.8 |
| LDPE (HP-tubular) | LDPE3 | 0.920 | 15 | 6.3 |
| LDPE 955I | LDPE4 | 0.923 | 35 | 2.8 |
| PP 5D49 | PP | 0.90 | 38 |  |

The resins categorized as HDPE and LDPE are available from The Dow Chemical Company. HDPE1 is an ethylene-octene copolymer that is prepared via a solution polymerization process in a dual reactor configuration connected in series in the presence of a catalyst system comprising a metal complex of a polyvalent aryloxyether, as described above.

LDPE resins represent an MI range from 2 g/10 min to 35 g/10 min and include tubular and autoclave grades. Polyproylene (PP) D549 is a fiber grade propylene homopolymer available from Braskem America Inc.

HDPE 1 is prepared via solution polymerization in a dual loop reactor system in the presence of a polyvalent aryloxyether catalyst, namely [2,2'''-[1,3-propanediylbis(oxy-κO)]bis[3'',5,5''-tris(1,1-dimethylethyl)-5'-methyl[1,1': 3',1''-terphenyl]-2'-olato-κO]]dimethyl-, (OC-6-33)-Zirconium, having the structure (I) disclosed above.

The polymerization conditions for HDPE1 (ethylene-octene copolymer) are reported in Tables 2 and 3. Referring to Tables 2 and 3, MMAO is modified methyl aluminoxane; and RIBS-2 is bis(hydrogenated tallow alkyl)methyl, tetrakis(pentafluorophenyl)borate(1-)amine.

TABLE 2

|  | Units | HDPE1 |
|---|---|---|
| 1. REACTOR FEEDS |  |  |
| Primary Reactor Feed Temperature | ° C. | 35.0 |
| Primary Reactor Total Solvent Flow | lbs/h | 487.6 |
| Primary Reactor Fresh Ethylene Flow | lbs/h | 183.0 |
| Primary Reactor Total Ethylene Flow | lbs/h | 187.0 |
| Comonomer Type Used |  | 1-octene |
| Primary Reactor Fresh Comonomer Flow | lbs/h | 1.60 |
| Primary Reactor Total Comonomer Flow | lbs/h | 3.29 |
| Primary Reactor Comonomer/Olefin Ratio | % | 1.70 |
| Primary Reactor Feed Solvent/Ethylene Ratio |  | 2.66 |
| Primary Reactor Fresh Hydrogen Flow | std cm³/min | 7090 |
| Primary Reactor Hydrogen Mole Percent | mol % | 0.58 |
| Secondary Reactor Feed Temperature | ° C. | 35.0 |
| Secondary Reactor Total Solvent Flow | lbs/h | 826.7 |
| Secondary Reactor Fresh Ethylene Flow | lbs/h | 310.0 |
| Secondary Reactor Total Ethylene Flow | lbs/h | 316.9 |
| Secondary Reactor Fresh Comonomer Flow | lbs/h | 2.72 |
| Secondary Reactor Total Comonomer Flow | lbs/h | 5.65 |
| Secondary Reactor Comonomer/Olefin Ratio | % | 1.73 |
| Secondary Reactor Feed Solvent/Ethylene Ratio |  | 2.67 |
| Secondary Reactor Fresh Hydrogen Flow | std cm³/min | 7373 |
| Secondary Reactor Hydrogen Mole Percent | mol % | 0.36 |
| Overall Comonomer/Olefin Ratio |  | 1.05 |
| Overall Solvent/Ethylene Ratio | wt % | 2.66 |
| 2. REACTION |  |  |
| Primary Reactor Control Temperature | ° C. | 159.9 |
| Primary Reactor Pressure | psig | 725.2 |
| Primary Reactor Ethylene Conversion | % | 97.2 |
| Primary Reactor Percent Solids | % | 27.3 |
| Primary Reactor Polymer Residence Time | h | 0.53 |
| Secondary Reactor Control Temperature | ° C. | 190.0 |
| Secondary Reactor Pressure | psig | 733.6 |
| Secondary Reactor Ethylene Conversion | % | 90.3 |
| Secondary Reactor Percent Solids | % | 26.6 |
| Secondary Reactor Polymer Residence Time | H | 0.11 |
| Primary Reactor Split | % | 38.1 |

TABLE 3

|  | Units | HDPE1 |
|---|---|---|
| 3. CATALYST |  |  |
| Primary Reactor Catalyst Type |  | Zr-Based bis-phenyl phenoxy Catalyst |
| Primary Reactor Catalyst Flow | lbs/h | 0.63 |
| Primary Reactor Catalyst Concentration | Ppm | 85.9 |
| Primary Reactor Catalyst Efficiency | 10⁶ Lb | 3.52 |
| Primary Reactor Catalyst-1 Mole Weight | Mw | 91.10 |
| Primary Reactor Co-Catalyst-1 Molar Ratio |  | 1.64 |
| Primary Reactor Co-Catalyst-1 Type |  | RIBS2 |
| Primary Reactor Co-Catalyst-1 Flow | lbs/h | 0.38 |
| Primary Reactor Co-Catalyst-1 Concentration | ppm | 2999 |
| Primary Reactor Co-Catalyst-2 Molar Ratio |  | 20.0 |
| Primary Reactor Co-Catalyst-2 Type |  | MMAO |
| Primary Reactor Co-Catalyst-2 Flow | lbs/h | 0.23 |
| Primary Reactor Co-Catalyst-2 Concentration | ppm | 1399 |
| Secondary Reactor Catalyst Type |  | Zr-Based bis-phenyl phenoxy Catalyst |
| Secondary Reactor Catalyst Flow | lbs/h | 0.88 |
| Secondary Reactor Catalyst Concentration | ppm | 199.3 |
| Secondary Reactor Catalyst Efficiency | 10⁶ Lb | 1.70 |
| Secondary Reactor Co-Catalyst-1 Molar Ratio |  | 1.50 |
| Secondary Reactor Co-Catalyst-1 Type |  | RIBS2 |
| Secondary Reactor Co-Catalyst-1 Flow | lbs/h | 1.16 |
| Secondary Reactor Co-Catalyst-1 Concentration | ppm | 2999 |
| Secondary Reactor Co-Catalyst-2 Molar Ratio |  | 9.99 |
| Secondary Reactor Co-Catalyst-2 Type |  | MMAO-3A |
| Secondary Reactor Co-Catalyst-2 Flow | lbs/h | 0.37 |
| Secondary Reactor Co-Catalyst-2 Concentration | ppm | 1399 |

HDPE2 is an ethylene-octene copolymer and is prepared via a solution polymerization process in a single reactor configuration, using a Ziegler-Natta catalyst. The properties of HDPE1 and HDPE2 are summarized in Table 4. Evident are differences in molecular weight distribution between the two resins, wherein the molecular weight distribution ($M_w/M_n$) is narrow for HDPE1 when compared to HDPE2.

TABLE 4

| Designation | Units | HDPE1 | HDPE2 |
|---|---|---|---|
| Density | (g/cc) | 0.950 | 0.950 |
| $I_2$ | (dg/min) | 17.4 | 17.2 |
| $I_{10}/I_2$ | | 6.12 | 6.66 |
| $M_w/M_n$ | | 2.05 | 3.55 |
| $M_w$ | ×10³ | 51.0 | 54.8 |
| $M_z$ | ×10³ | 83.2 | 144.8 |
| $M_z/M_w$ | | 1.63 | 2.64 |
| CDC | | 142.3 | 147.8 |
| CDI | | 0.95 | 0.950 |
| STDEV | ° C. | 4.412 | 5.9 |
| HalfWidth | ° C. | 2.945 | 3.8 |
| HfWid/STDEV | | 0.67 | 0.64 |
| ZSVR | | 1.32 | 1.07 |
| Vinyls/10⁶ C | | 55 | 323 |

2. Blends

Figure 2:
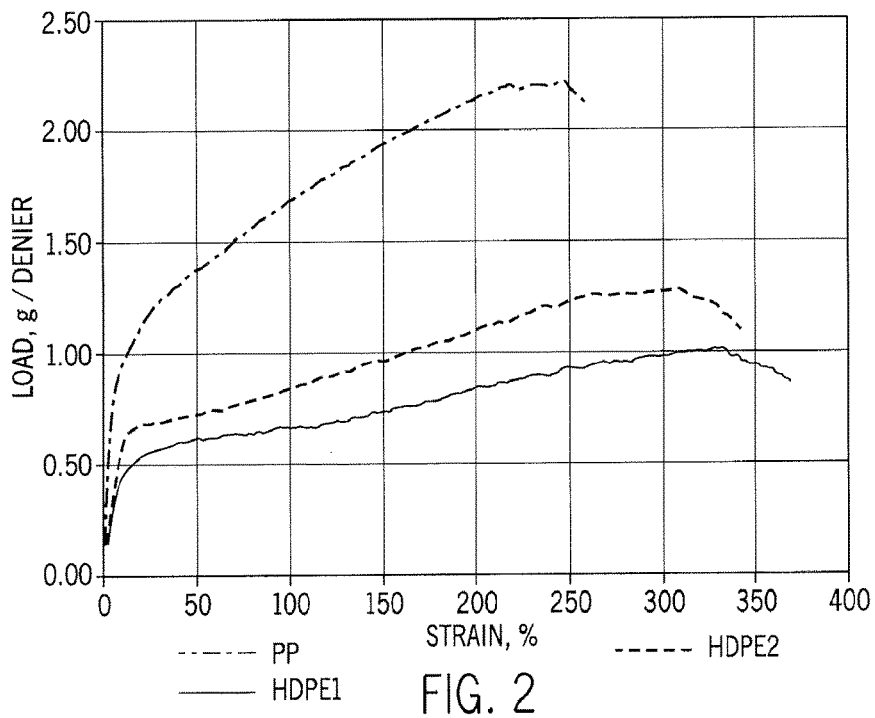
FIG. 2 is a graph showing load-elongation curves for 2 denier per filament fibers of HDPE1, HDPE2, and PP.

Melt blends of HDPE resins with minor amounts of LDPE are prepared with a ZSK 30 co-rotating intermeshing twin extruder, as described above. Neat resin controls for HDPE 1 and HDPE2 given in Table 5, and FIG. 2, are also subjected to the same processing history in ZSK30, as for blends. The specific LDPEs and blend ratios used in the examples are given in Table 5.

3. Fiber Tensile Properties and Ramp-To-Break Measurements

Various compositions are processed into fibers of 2 denier per filament for measurement of tensile properties, and are also evaluated with ramp-to-break protocol.

3a. HDPE and PP Controls

Load elongation curves for the HDPE1, HDPE2, and controls and PP5D49 fibers are shown in FIG. 2.

TABLE 5

| ID No | Composition | 3% Secant Modulus (g/denier) | Tensile Strength (g/denier) | Avg Ramp-to-Break (mpm) |
|---|---|---|---|---|
| 1a | HDPE1 | 6.0 | 0.97 | 3000 |
| 1b | HDPE2 | 7.7 | 1.26 | 2600 |
| 1c | PP5D49 | 18.2 | 2.01 | 5000 |
| 2a | HDPE1(97)/LDPE1(3) | n/a | n/a | 2250 |
| 2b* | HDPE1(97)/LDPE2(3) | 11.3 | 1.05 | 3000 |
| 2c* | HDPE1(97)/LDPE3(3) | 9.8 | 1.03 | 3000 |
| 2d | HDPE1(97)/LDPE4(3) | n/a | n/a | 2950 |
| 3a* | HDPE1(98)/LDPE2(2) | 10.0 | 1.04 | 2800 |
| 3b* | HDPE1(96)/LDPE2(4) | 13.3 | 1.12 | 2600 |
| 3c* | HDPE1(95)/LDPE2(5) | 18.0 | 1.19 | 2600 |
| 3d* | HDPE1(98)/LDPE3(2) | 8.7 | 1.01 | 3000 |
| 3e* | HDPE1(96)/LDPE3(4) | 11.1 | 1.08 | 3000 |
| 3f* | HDPE1(95)/LDPE3(5) | 12.3 | 1.03 | 3000 |
| 4a | HDPE2(97)/LDPE2(3) | 12.6 | 1.31 | 2500 |
| 4b | HDPE2(97)/LDPE3(3) | 9.2 | 1.26 | 2500 |

Figure 3:
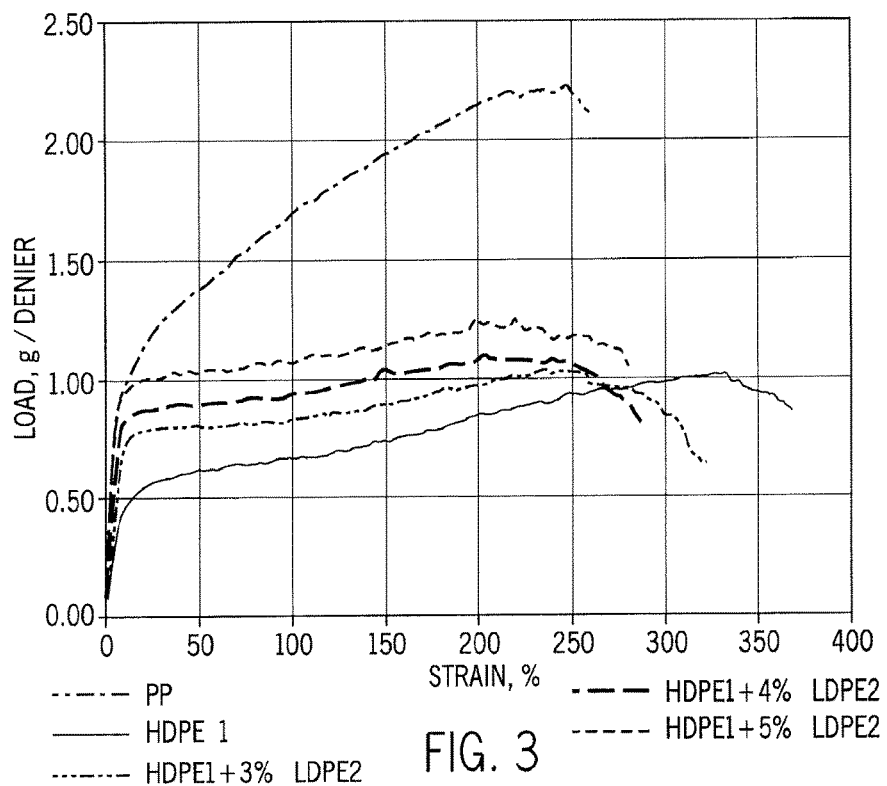
FIG. 3 is a graph showing load-elongation curves for 2 denier per filament fibers of blends of HDPE1 with 3%, 4% and 5% LDPE2.
Figure 4:
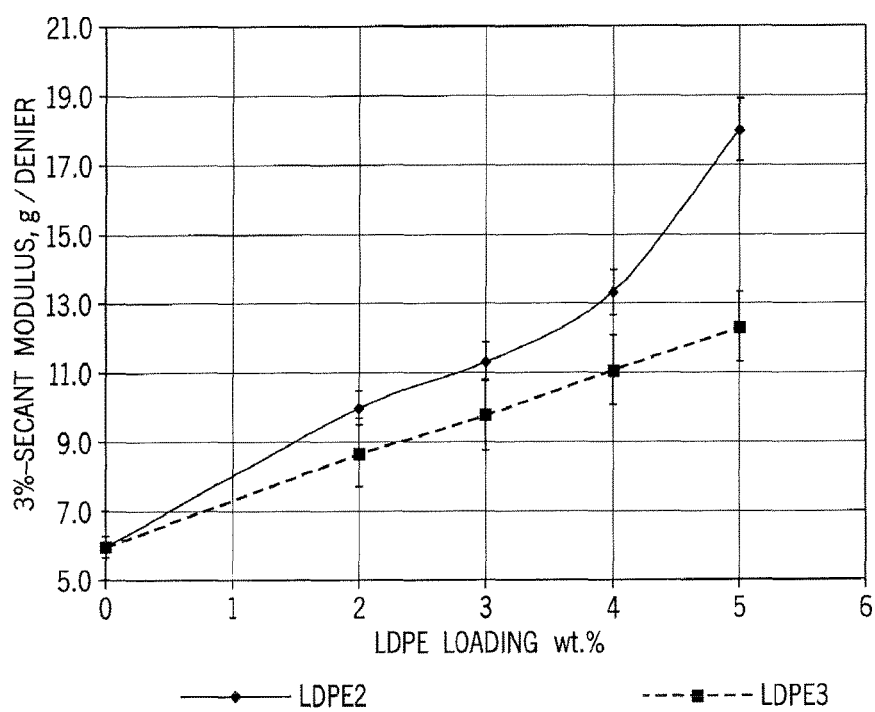
FIG. 4 is a graph showing secant modulus at 3% elongation for 2 denier per filament fibers of HDPE1 blended with various levels of LDPE2 and LDPE3.

Component amounts of blends shown in parentheses is in wt % based on total weight of blend
*inventive example 3b. Melt-Blends of HDPE with LDPE: Effect of LDPE Type at 3% Loading The corresponding stress-strain curves for examples 2a to 2d, as well as 1a and 1c, are given in FIG. 3.

Data in Table 5 indicates that 3% secant modulus is significantly improved upon addition of 3% LDPE2 or LDPE3 into HDPE1, where the magnitude of improvement follows the order of melt index of LDPE. Inventive examples 2b, 2c, 3a, 3b, 3c, 3d, 3e, and 3f, exhibit a 3% secant modulus from 8.5 g/denier to 20 g/denier; and Inventive examples 2a, 2b, 3a, 3b, 3c, 3e, 3f, exhibit a 3% secant modulus from 10 g/denier to 20 g/denier. Examination of tensile strength data reveals values that are insensitive to LDPE type and remain close to that of HDPE1 (sample 1a). The data on ramp-to-break suggests an optimal range for LDPE melt index, where the ramp to break of the blend is equivalent, within experimental error, to that of neat HDPE1, at 3000 mpm. At low melt index, as in the case of Example 2a, there is a significant deterioration in ramp-to-break, likely associated with enhanced elasticity of the melt. Increasing the melt index of LDPE blended into HDPE1 improves the ramp to break (Examples 2b, 2d). Though there are no secant modulus data given in Table 5 for blends of LDPE4—given the trends in secant modulus with increasing LDPE melt index, it is evident that adding 3% LDPE with a melt index in the range of 7 g/10 min to 15 g/10 min provide a ramp to break performance comparable to that of neat HDPE1, at the same time providing improvement in secant modulus. Increasing the melt index further, though not expected to deteriorate ramp-to-break, is also not beneficial for improvement of secant modulus.

3c. Melt-Blends of HDPE1 with LDPE: Effect of LDPE Loading

The effect of LDPE loading on the fiber properties is illustrated with data on blends of HDPE1 with LDPE2 and LDPE3, in the range 2 wt % to 5 wt % LDPE loading in Table 5 above.

The level of improvement in secant modulus is more significant for blends of LDPE2 vs. LDPE3; however, in the case of blends with LDPE3, the ramp to break remains unaffected, compared to Sample 1a, irrespective of LDPE loading, in the range 2 to 5%. Hence, the range of melt index comparable to that of LDPE3, appears to be advantageous, as it provides enhancement in tensile modulus up to values double that of the control (Sample 1a)—without any compromise in ramp-to-break property.

4. Melting and Crystallization Behavior

The influence of LDPE addition on melting and crystallization behavior is explored with a few blends, using differential scanning calorimetry, as described above, and is summarized in Table 6. The result on crystallization peak temperature suggests that LDPE addition increases the crystallization temperature of the HDPE, as is observed with nucleators, despite the fact that the crystallization temperature of pure LDPEs is lower than that of HDPE1 and HDPE2.

TABLE 6

| Sample Description | $T_{m1}$ (° C.) | Heat of Melting (J/g) | $T_{c1}$ (° C.) | Heat of Cryst. (J/g) |
|---|---|---|---|---|
| HDPE1 | 129.3 | 204.3 | 115.0 | 205.2 |
| HDPE2 | 128.7 | 199.1 | 114.6 | 207.3 |
| HDPE1 + 3% LDPE2 | 129.3 | 203.4 | 118.4 | 212.4 |
| *HDPE2 + 3% LDPE2 | 129.2 | 195.1 | 117.4 | 203.0 |

*Inventive Example

5. Birefringence as an Indicator of Fiber Orientation

Measurements of birefringence are performed for a select set of samples to compare and contrast the influence of LDPE type and loading, on the overall orientation of fibers. The measurement protocol is described in the previous section. Results for 2 denier fibers are given in Table 7.

TABLE 7

| ID No. | Birefringence (×10³) | Std. Dev |
|---|---|---|
| 1a | 27.8 | 2.2 |
| 1b | 38.3 | 1.0 |
| 2a | 41.9 | 1.0 |
| 2b | 39.0 | 1.0 |
| 2c | 36.0 | 0.4 |
| 2d | 32.1 | 2.6 |
| 3a | 38.2 | 1.3 |
| 3b | 41.4 | 1.4 |
| 3c | 41.4 | 1.0 |

Data in Table 7 suggests that the orientation in neat HDPE2 fibers is significantly higher than in neat HDPE1 fibers, likely due to the broader molecular weight distribution in HDPE2. Data for Examples 2a to 2d indicates that enhancement in orientation for 3% LDPE addition is dependent on LDPE melt index, and increases with decreasing melt index, as is observed also for fiber modulus data. Even though the birefringence achieved for Examples 2b and 2c are comparable to that of HDPE2 (Example 1b), the corresponding modulus for is higher for blends compared to pure HDPE2. Data on Examples 3a to 3c suggests that even small amounts of LDPE, as low as 2%, enhances the orientation of HDPE1 fibers. The level of orientation did not increase much beyond 3% LDPE addition.

6. Surface Roughness of Fibers

Examination of fibers with a Scanning Electron Microscope (SEM) and optical microscopy further reveal an unexpected influence of LDPE blending into HDPE1, which is in qualitative agreement with observations on modulus and birefringence. FIG. 5 is a SEM micrograph of spunbond nonwoven fabrics made with HDPE1. In FIG. 5, surface roughness is evident in the fibers which are 2 denier. In comparison, the SEM micrograph of the HDPE2 spunbond nonwoven fabric made in identical processing conditions features smooth fibers (at given level of magnification), FIG. 6. Analysis performed for cross-sections of nonwovens by optical microscopy reveal that surface roughness of fibers is associated with large spherulites present in HDPE1 fibers, shown in the inset of FIG. 5. In contrast, such texture is not present in HDPE2 fibers (inset in FIG. 6).

Microscopy performed for fibers of Examples 1a and 2b are given in FIGS. 7 and 8 respectively. Evidently, the surface roughness visible for HDPE1 (Example 1a) is not as pronounced as in that observed for the nonwoven fabric (FIG. 5)—possibly due to different processing history. Nevertheless, the surface roughness is clearly evident in FIG. 7 and scales well with the fine spherulitic texture given in the inset. Upon addition of 3% LDPE2 (Example 2b) given in FIG. 8, the roughness is altogether removed. This effect is associated with increased orientation afforded by LDPE blending, and an accompanying shift in the mode of the crystallization that is well known for polyethylene involving enhanced row-nucleation.

7. Results Summary

We have discovered unexpectedly that addition of minor amounts of LDPE with a majority amount of HDPE1 improves modulus and tensile strength of fibers. An enhancement of 2× to 3× in modulus, as measured by 3% secant modulus, is achievable by adding 1 wt % to 5 wt % LDPE to HDPE 1. Bounded by no particular theory, the improvement in tensile strength appears to be a consequence of increased overall orientation attained by LDPE addition, as confirmed by birefringence measurements. Addition of LDPE to HDPE1 also increases the onset of crystallization in quiescent state as evident in DSC data.

The data presented herein illustrates that by selection of LDPE grade and its loading in the blend these enhancements can be achieved without a compromise in draw-down behavior of the fibers, as measured by ramp-to-break tests. The latter is an important constraint on the feasibility of blending LDPE into HDPE, as LDPE resins of MI comparable to HDPEs used herein are known to have poor spinning performance due to elevated melt elasticity attributable to long chain branching. As such blend compositions exhibiting no significant deterioration in ramp-to-break, at the same time providing an enhancement in modulus are to be preferred.

Further, we have discovered that addition of 1 wt % to 5 wt % LDPE to HDPE1 effectively suppresses surface roughness attributable to spherulitic morphology in HDPE1. Polymers with narrow molecular weight distribution, such as HDPE1, exhibit excellent spinning performance, as evident in high ramp to break compared to HDPE2. Bounded by no particular theory, the narrow molecular weight distribution appears to promote surface roughness, due to formation of large spherulites unimpeded by immense rate of elongation combined with cooling characterizing the melt spinning process, described herein. Addition of 1 wt % to 5 wt % of LDPE effectively reduces and eliminates this surface roughness in HDPE1. The sensitivity of the surface roughness to LDPE addition may be used to modulate the surface roughness as desired, to possibly manipulate properties like coefficient of friction, abrasion resistance, and tactile properties like fabric hand and softness.

LDPE grades with MI from 7 g/10 min to 15 g/10 min provide a good balance of enhanced modulus combined with retention of ramp-to-break draw-down. At the higher melt index range, the sensitivity of ramp-to-break is less to LDPE loading. Therefore LDPE grades with 7 g/10 min to 15 g/10 min melt index appear to be most suitable as blending partners at 3% to 5% level of addition. Narrow molecular weight distribution HDPEs, as in HDPE1, appear to benefit most from blending, in terms of enhanced orientation, which is also evident in the suppression of spherulitic texture in these fibers upon LDPE addition, giving rise to much reduced surface roughness.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A fiber comprising:
   a polymeric blend comprising
   from 95 wt % to 99 wt % of a high density ethylene-based polymer having a $M_w/M_n$ from 2.0 to 3.0;
   from 5 wt % to 1 wt % of a low density ethylene-based polymer having a melt index from 5 g/10 min to 15 g/10 min wherein the low-density ethylene-based polymer is present to the exclusion of linear low density polyethylene; and
   the fiber having a density from 1 denier to 2 denier and a 3% secant modulus from 8.5 g/denier to 20 g/denier.

2. The fiber of claim 1 having a 3% secant modulus from 10 g/denier to 20 g/denier.

3. The fiber of claim 1 having a ramp-to-break from 2600 mpm to 3200 mpm.

4. The fiber of claim 1 wherein the high density ethylene-based polymer has a density from greater than 0.930 g/cc to 0.96 g/cc and a melt index from 15 g/10 min to 20 g/10 min.

5. The fiber of claim 1 wherein the high density ethylene-based polymer has a Mz/Mw less than 2.0.

6. The fiber of claim 1 wherein the high density ethylene-based polymer has a zero-shear viscosity ratio greater than 1.1.

7. The fiber of claim 1 wherein the high density ethylene-based polymer has a vinyls/$10^6$ carbons of less than 100.

8. The fiber of claim 1 wherein the low density ethylene-based polymer has a density from 0.915 g/cc to 0.925 g/cc and a melt index from 5 g/10 min to 15 g/10 min.

9. The fiber of claim 1 wherein the fiber is a melt-spun fiber.

10. The fiber of claim 1 wherein the fiber has a density of 2 denier, a 3% secant modulus from 10 g/denier to 20 g/denier, a tensile strength from greater than 1.0 g/denier to 1.3 g/denier, and a ramp-to-break from 2600 mpm to 3200 mpm.

11. The fiber of claim 1 wherein the fiber has a heat of crystallization greater than 205 J/g.

12. A fabric comprising the fiber of claim 1.

13. The fiber of claim 1 wherein the high density ethylene-based polymer is an ethylene/octene copolymer.

14. A fiber comprising:
a polymeric blend comprising
from 95 wt % to 99 wt % of a high density ethylene-based polymer having
(i) a $M_w/M_n$ from 2.0 to 3.0;
(ii) a zero-shear viscosity ratio greater than 1.1;
from 5 wt % to 1 wt % of a low density ethylene-based polymer (LDPE) having a melt index from 5 g/10 min to 15 g/10 min, the LOPE present to the exclusion of linear low density polyethylene; and
the fiber having a density from 1 denier to 2 denier and a 3% secant modulus from 8.5 g/denier to 20 g/denier.

15. The fiber of claim 14 wherein the high density ethylene-based polymer has a Mz/Mw less than 2.0.

16. The fiber of claim 15 wherein the high density ethylene-based polymer has a density from greater than 0.930 g/cc to 0.96 g/cc and a melt index from 15 g/10 min to 20 g/10 min.

17. The fiber of claim 16 having a ramp-to-break from 2600 mpm to 3200 mpm.

18. The fiber of claim 17 wherein the high density ethylene-based polymer is an ethylene/octene copolymer.

* * * * *